United States Patent [19]
Adler et al.

[11] 3,975,722
[45] Aug. 17, 1976

[54] PROTECTIVE ALARM SYSTEM

[76] Inventors: Shaul Adler, 4 Eban Gevirol St.;
Dani Adler, 25 Hess St., both of Herzelia, Israel

[22] Filed: Feb. 3, 1975

[21] Appl. No.: 546,473

[52] U.S. Cl............................. 340/261; 340/52 H; 200/61.52; 200/61.83
[51] Int. Cl.² ................. G08B 21/00; H01H 35/02; H01H 35/14
[58] Field of Search.................. 340/52 R, 52 H, 65, 340/261; 200/61.52, 61.45, 61.83

[56] References Cited
UNITED STATES PATENTS

| | | | |
|---|---|---|---|
| 2,947,830 | 8/1960 | Goss | 340/65 X |
| 3,659,265 | 4/1972 | Eversull | 200/61.52 X |
| 3,715,533 | 2/1973 | Seaton | 200/61.52 |

*Primary Examiner*—John W. Caldwell
*Assistant Examiner*—William M. Wannisky
*Attorney, Agent, or Firm*—Lawrence Rosen; E. Janet Berry

[57] ABSTRACT

A vibration sensitive electrical alarm system comprising an electrically conductive pendulum means swingably suspended from an axle member, a pendent body pivotally attached to said axle and having an electrically conductive projection secured to it extending in the direction of said pendulum means, the arrangement being such that when the pendulum means is set into motion, it is adapted to touch said projection whereby an alarm is activated.

3 Claims, 5 Drawing Figures

U.S. Patent   Aug. 17, 1976   Sheet 1 of 2   3,975,722

PROTECTIVE ALARM SYSTEM

BACKGROUND OF THE INVENTION

Field of the Invention

The present invention relates to anti-theft protective devices and in particular to a vibration-sensitive electrical alarm system.

While the device of this invention has a very simple construction, it includes many features to make it a highly sensitive and very reliable alarm system.

Moreover, in view of its design, it is well adapted to be attached to different objects in order to protect them against theft.

Although this device is suitable to protect various objects against unauthorized handling, it is especially adapted to inhibit the theft of all kinds of vehicles like bicycles, motor bicycles and motor-cars. Furthermore, since the device is a vibration-sensitive system, it protects also against disassembling of parts from such objects of vehicles which provides a very important advantage to the system.

Another advantage of the device of this invention is its capability to automatically cease the alarming signal after a short period when the cause for initiating the alarm is gone, thus automatically preventing the unnecessary draining of the power source.

SUMMARY OF THE INVENTION

According to the invention there is provided a vibration sensitive electrical alarm system comprising an electrically conductive pendulum means swingably suspended from an axle member, a pendent body pivotally attached to said axle and having an electrically conductive projection secured to it extending in the direction of said pendulum means, the arrangement being such that when the pendulum means is set into motion, it is adapted to touch said projection whereby an alarm is activated.

DESCRIPTION OF THE PRIOR ART

In Israel Pat. Nos. 2892 and 5454 there are disclosed alarm devices in which a freely suspended pendulum is adapted to initiate said alarm by making or breaking contact when set into motion. However, neither of said Patents teach or suggest the present invention which is based on the cooperative functioning of a pivotally suspended pendent member and a freely suspended pendulum. This arrangement assures that independently of the positioning of the alarm device itself, the distance between the two alarm initiating members, i.e., the pendulum and a contact member, will remain at a constant preset distance. This great advantage will become more apparent from the following description of the invention with reference to several preferred embodiments thereof.

BRIEF DESCRIPTION OF THE DRAWINGS

In order that the invention may be understood more fully, reference should be had to the following drawings in which.

Figure 1:
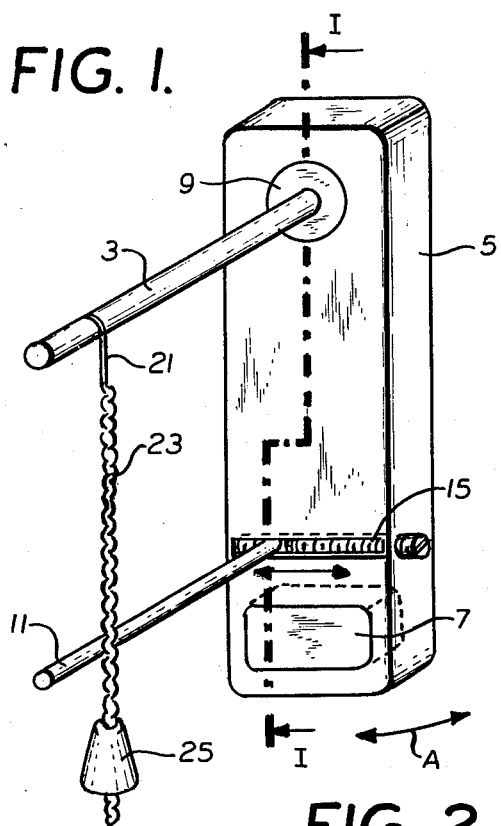
FIG. 1 shows a perspective view of one embodiment of the alarm system.
Figure 3:
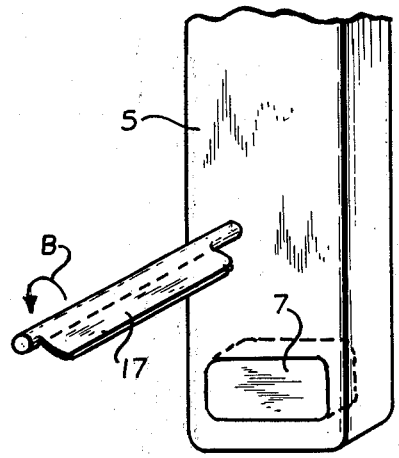
FIG. 3 shows a different embodiment of one part of the device.

As seen in the figures the device consists of a housing 1 to which there is fixed an axle 3 which may be hollow to accomodate electrical wires. A pendent body 5, which may have a weight 7 fixed to it or embedded in it, is pivotally attached to the axle 3, and designed to swing about the axle under the influence of gravity. For this purpose, a bearing unit 9 is provided, which enables the free pivotal movement of the pendent about the axle, as indicated by the arrow A. To pendent 5 there is adjustably attached a rod-like projection 11 which is made of an electrically conductive material, or to which an electrically conductive strip 13 is fixed. The rod-like projection 11, as illustrated in FIG. 1 is attached to the pendent at a point which is off the longitudinal center line which bisects the axle 3, and may be adjustably moved by means of a screw and worm or the like arrangement 15 across the pendent 5. Alternately, as seen in FIG. 3, the projection-like body may be provided with a wing or a similar extension 17 and is adapted to be turned about its axis as indicated by arrow B.

Suspended from axle 3 there is a pendulum 19, preferably made of 3 parts. A rigid semi-rigid or resilient part 21 is attached on one end to the axle 3. At its second end it is connected to a chain 23 or the like, made of conductive material to which chain there may be fixed a weight 25 which can be fixedly secured along said chain's length at any point.

Two leads 27, one electrically connected to the pendulum's chain 23 and the other to the projection 11 or at least to the strip 13 or to the wing like extension 17, are provided for connection into circuit producing sound, light, shock or the like. The chain, the strip and wing-like extension may be made of silver or silver coated for better conductivity.

Now, the casing 1 containing the device may be attached, say, to a vehicle, so positioned that axle 3 is aligned with the direction of movement of the vehicle. Projection 11 is adjusted to stay very close (e.g. 2 or 4 mm) to the hanging pendulum, and the leads 27 are connected to the car's horn system.

Figure 2:
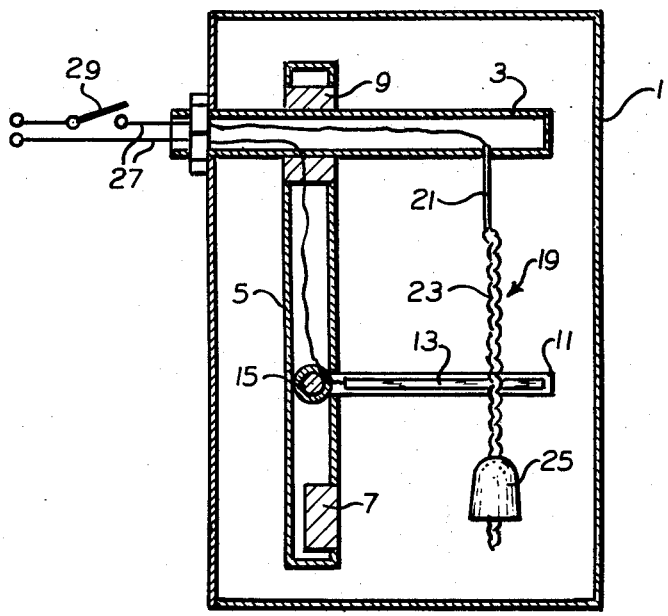
FIG. 2 shows a side view partly in section along line I—I of the alarm system shown in FIG. 1.

When the device is to be set for operation, a switch 29 (see FIG. 2) which may be a regular or a key operated switch, is closed. If the car is then moved or even slightly vibrated the pendulum, which is adapted to swing in response to even slight motion of the vehicle, is set into motion and swings about its attachment point. These swinging movements will cause the chain to touch the strip 13 or wing 17 of pendent body 5, which is adapted to be substantially insensitive to slight motions of the vehicle and to close the electrical circuit which activates the alarm means. The alarm will be activated just as long as the chain touches the strip or the wing. Hence, the swinging movements will cause corresponding alarm signals to be produced. The duration and frequency of the alarm may therefore be adjusted by adjusting the pendulum's length, i.e. the height of the weight 25 along the chain and its distance from the strip or wing. The alarm's sensitivity to vibrations may also be controlled by the adjustment of the gap between the pendulum and the strip or wing when the pendulum is at rest. The smaller the gap the more sensitive the device becomes, since only a slight movement of the protected object, which results in corresponding slight swinging motions of the pendulum, will suffice to cause the latter to make contact with the electrically conductive projection to close the alarm circuit.

It should be pointed out that the device's reliability is greatly increased by the pendent arrangement, since both the pendulum and the projection 11 which is attached to the pendent will always stay at the same preset distance between them in view of the fact that they are both gravity influenced. Thus, the fact that both are similarly gravity influenced assures the operability of the device even when the vehicle is parked on an incline, due to said pendent arrangement.

Figure 4:
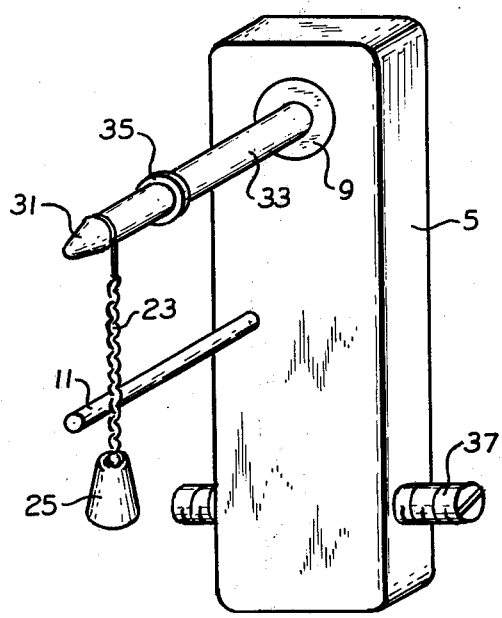
FIG. 4 shows still another embodiment of the invention.

In FIG. 4 still another possible arrangement of a pendent, axle and pendent adjusting means is shown. According to this embodiment pendent 5 is entirely made of metal and is adapted to swing about axle 3 in the manner described above. Axle 3, however, is in this case of a construction similar to a coaxial plug, having a conductive end portion 31 extending from an outer rod-like hollow member 33 and being electrically insulated from it by a sleeve-like sheath, end part 35 of which is shown. While in the former embodiments the distance between the pendulum's chain and projection 11 can be adjusted by the manipulation of the projection, according to this embodiment, projection 11 may be fixedly secured to the pendent and the whole pendent can be adjusted, in relation to the pendulum. This is accomplished by turning screw member 37 in a threaded hole provided across the pendent to shift the pendent's weight to overcome the force of gravity acting upon it and in turn to bias it toward one side relative the freely suspended pendulum, so that the distance between the pendent and the pendulum, when at rest, may be varied.

The electrical connection to initiate the alarm is achieved, in the same way as in the other embodiments. Projection 11, pendent body 5 and part of the coaxial plug-like axle are electrically interconnected so that whenever the pendulum touches one of said elements the circuit will be closed and the alarm will be actuated.

Figure 5:
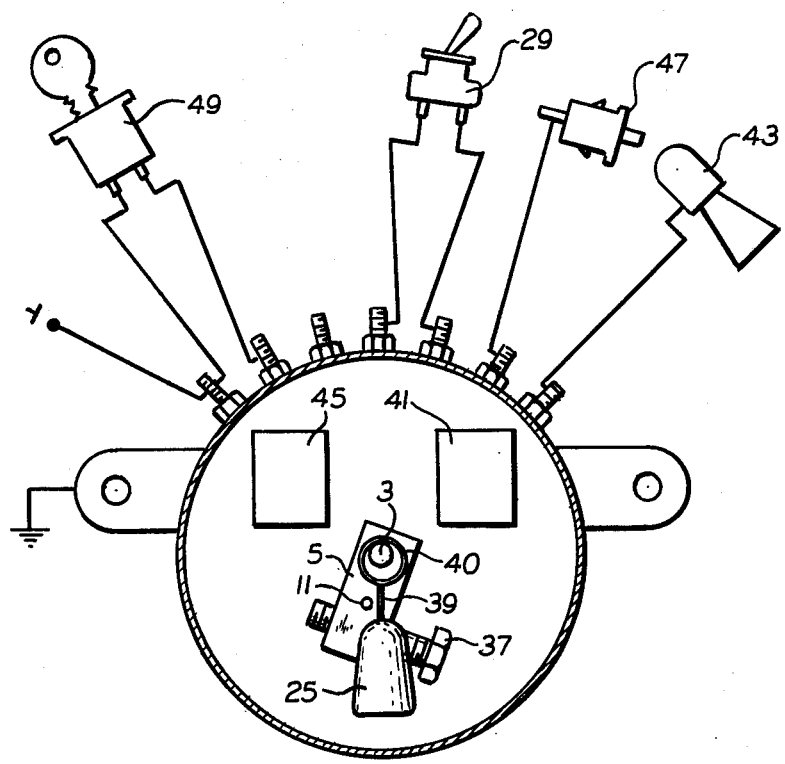
FIG. 5 illustrates still a further embodiment of the device.

Turning now to FIG. 5, there is shown still a further embodiment of the device and the manner in which it is wired to the different parts of a motor-vehicle. As seen, the weight 25 of a pendulum is attached to a rigid conductive wire 39. The wire is suspended from the axle 3 by a ring 40 and is adapted to make contact with the projection 11 whenever the pendulum is set into motion as hereinbefore described.

According to this embodiment, however, whenever the pendulum makes contact with said projection, it trips a relay 41 which activates the horn 43. Alternatively, said relay may actuate a timer 45 which is adjusted to repeatedly activate the horn for a period of a predetermined time, as long as the cause for the alarm prevails, i.e. so long as the pendulum touches projection 11 and/or the relay is directly actuated. The device may also include a special terminal to be wired to a push-button switch 47 adapted to actuate the relay 41 whenever said push-button is released for example when a door, engine hood or trunk lid is opened. In the same manner the main vehicle starting switch 49 may also be wired to the device for protection against unauthorized starting of the motor.

While in the embodiment shown in the Figures pendent 5 is adapted to swing only in two directions, it is well within the ambit of this invention to have the pendent suspended from the casing in a manner as to allow it to assume any position which is governed by gravity in 360° about its suspending point. Furthermore, said projection could end in a T-shaped or U-shaped head to increase the possible points of contact.

Finally it should be now realized that the device described is very well suited to protect a parked vehicle against unexperienced drivers trying to park their vehicles adjacent the protected vehicle and who in the process might tend to bump into said parked vehicle. In this common situation, the alarm will sound immediately upon the slightest impact and caution the driver.

It will be evident to those skilled in the art that the invention is not limited to the details of the foregoing illustrative embodiments and that the present invention may be embodied in other specific forms without departing from the spirit or essential attributes thereof. It is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A vibration sensitive electrical alarm system comprising an electrical conductive pendulum means swingably suspended from an axle member, a pendent body pivotally attached to said axle and having an electrically conductive projection secured to it extending in the direction of said pendulum means, said pendent being provided with adjustable biasing means adapted to vary its distance from said pendulum when the pendulum is at rest, wherein said biasing means is a screw adapted to turn in a thread provided in the pendent in a plane substantially normal to the longitudinal axis of the pendent and thereby to shift the weight of the pendent to overcome the force of gravity acting upon it and in turn to bias it toward one side relative the freely suspended pendulum, the arrangement being such that when the pendulum means is set into motion, it is adapted to touch said projection whereby an alarm is activated.

2. The system as claimed in claim 1 wherein said axle member is a coaxial plug, the pendulum is suspended from its first end while said pendent is pivotally attached at the coaxial plug's second end and is electrically insulated from said plug's first end.

3. The system as claimed in claim 1 further comprising a relay in circuit with said pendulum said relay being adapted to activate an alarm whenever the pendulum touches said projection.

* * * * *